Jan. 27, 1953 W. H. SILVER ET AL 2,626,549
QUICK DETACHABLE TRACTOR MOUNTED LISTER
Filed April 6, 1945 2 SHEETS—SHEET 1
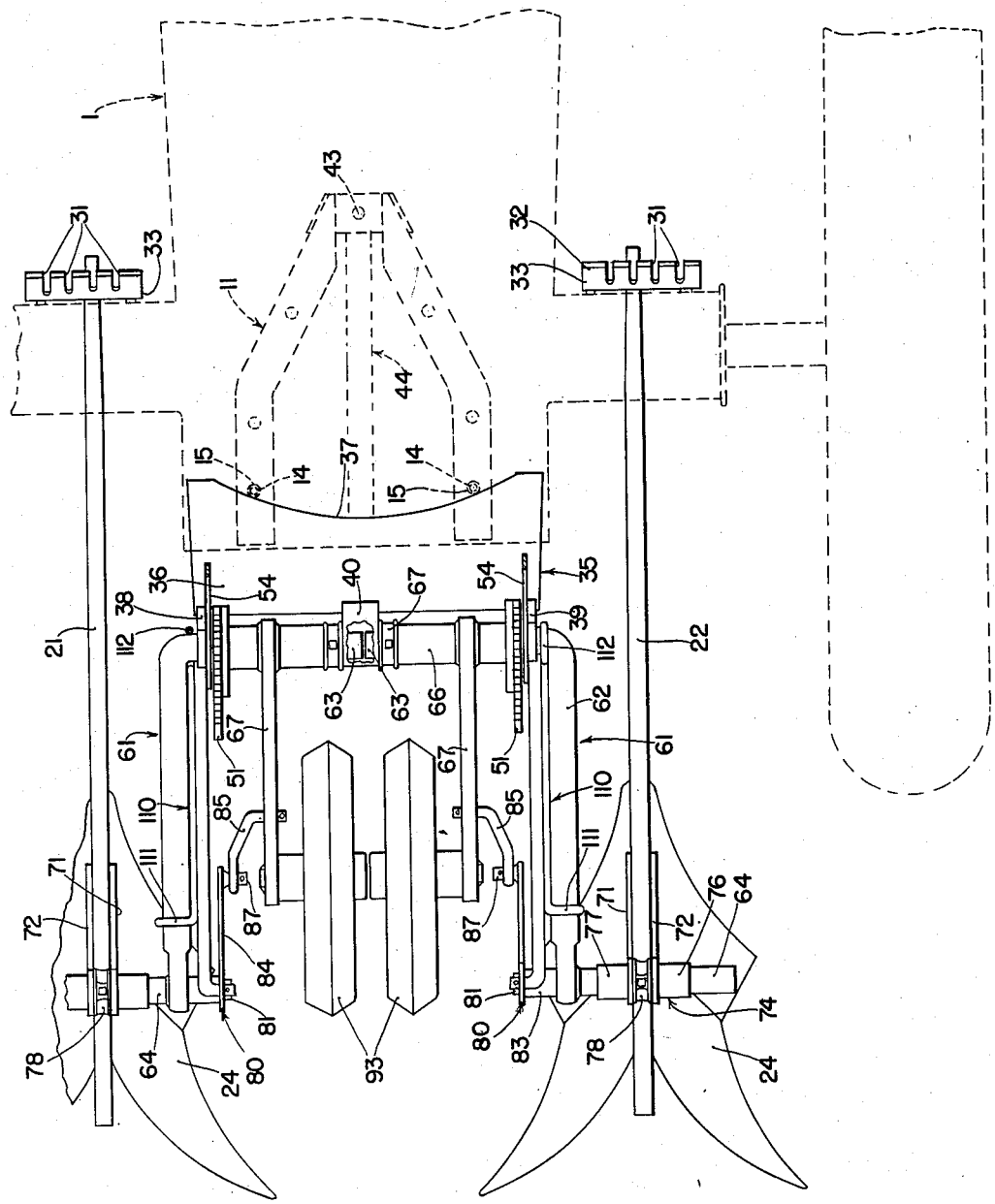
FIG. 1
INVENTOR.
WALTER H. SILVER
ROBERT E. COX
BY 
ATTORNEYS

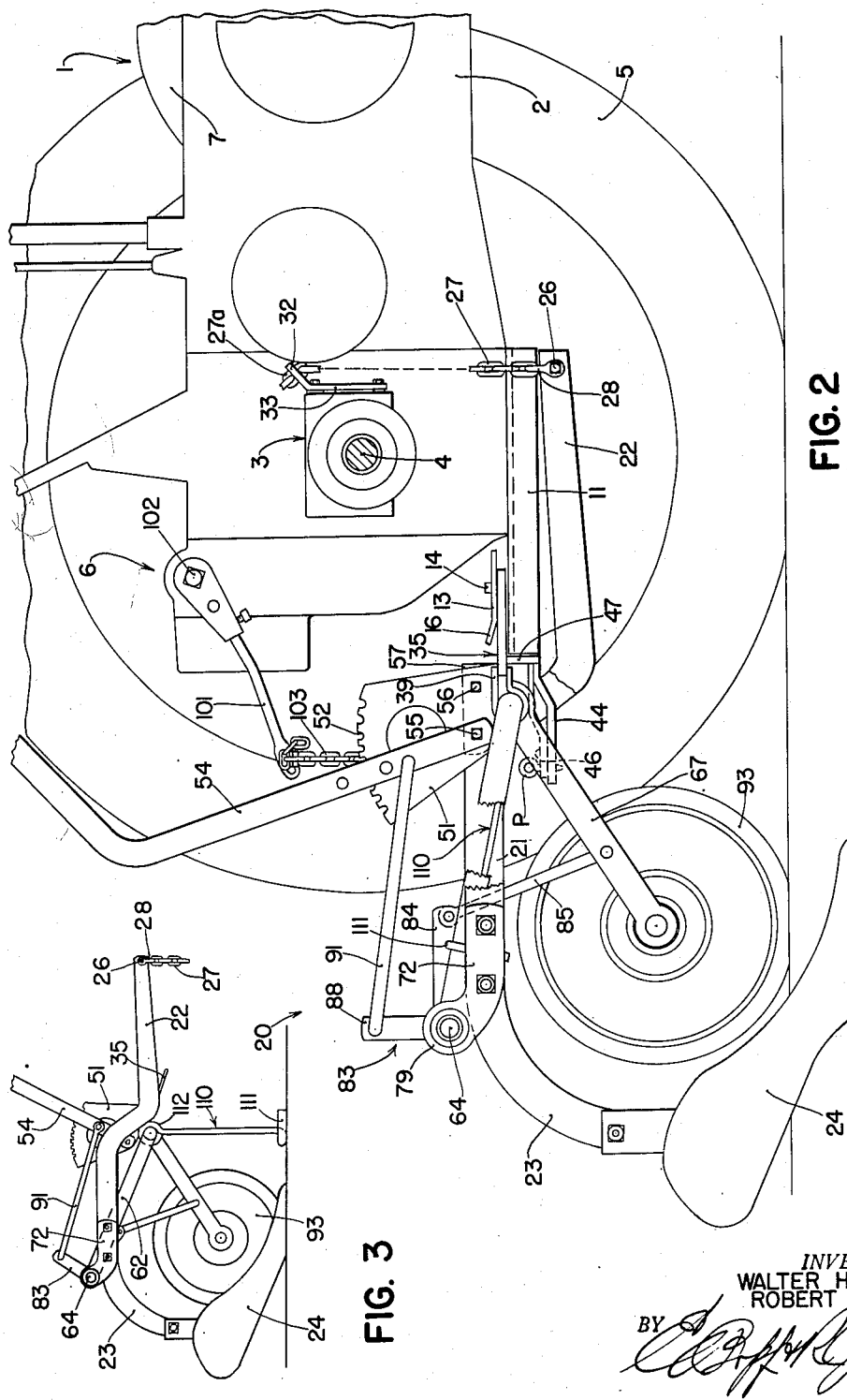

Patented Jan. 27, 1953

2,626,549

UNITED STATES PATENT OFFICE 2,626,549

QUICK DETACHABLE TRACTOR MOUNTED LISTER

Walter H. Silver and Robert E. Cox, Moline, Ill., assignors to Deere & Company, Moline, Ill., a corporation of Illinois Application April 6, 1945, Serial No. 586,954

15 Claims. (Cl. 97—47)

The present invention relates generally to agricultural machines and more particularly to implements of the type that are mounted on a tractor.

The object and general nature of the present invention is the provision of new and improved mounting means whereby the implement may be readily connected to or disconnected from a tractor in a very short period of time.

Another feature of this invention is the provision of novel depth adjusting means which is attached to or disconnected from the tractor with the implement.

These and other objects and advantages of the present invention will be apparent to those skilled in the art after a consideration of the following detailed description, taken in conjunction with the accompanying drawings, in which:

Figure 1 is a plan view of a two row lister in which the principles of the present invention have been incorporated.

Figure 2 is a side view of the implement shown in Figure 1.

Figure 3 is a fragmentary view showing the implement supported independently of the tractor and in a position to be reengaged therewith.

Referring now to the drawings, the tractor is indicated in its entirety by the reference numeral 1 and includes a main tractor body 2 to the rear end of which a rear axle structure 3 is connected. The latter includes quill sections in which drive shafts 4 are mounted for rotation, the axle shafts 4 receiving the usual traction wheels 5. The tractor 1 also includes a power lift unit 6 that is adapted to be actuated by power derived from the tractor motor 7. The tractor 1 is provided with a drawbar support 11 which is bolted or otherwise secured to the underside of the tractor rear axle 3, and bolted to the upper side of the rear portion of the hitch 11 is a stationary plate 13, secured to the hitch structure 11 by bolts 14 and two spacers 15. The rear edge of the plate 13 is turned upwardly, as at 16, and forms with the hitch structure a rearwardly facing socket adapted to receive a hitch member that forms a part of an implement attachable to and detachable from the tractor 1.

The implement chosen to illustrate the principles of the present invention is shown as a two row lister 20 which will now be described.

A pair of longitudinally extending beams 21 and 22 are turned downwardly at their rear ends, as at 23, and carry furrow openers 24 or other suitable tools, as desired. The forward end of each of the beams 21 and 22 is apertured to receive a bolt 26 (Figure 2) which serves to connect the lower end of a chain 27 thereto, preferably through a clevis 28. The upper end of the chain 27 is hooked into one of a plurality of slots 31 formed in the forwardly and upwardly angled portion 32 of a bracket 33 bolted to the forward side of the rear axle quill. The slots 31 are so formed as to receive a link of the chain 27 which is held in place therein by the next upper link of the chain, as best shown in Figure 2. Different links may be disposed in the slot 31 so as to raise or lower the front end of the beam 22 whenever it is desired to change the angle, or suck, of the lister bottoms 24.

A hitch member 35 comprising a plate 36 having an arcuate front edge 37 and provided with a plurality of loops or brackets 38, 39 and 40 is adapted to be received by the socket member that is made up of the plate 13 and the rear portion of the tractor drawbar support 11. The edge 37 is arcuate about a point 43 where the front end (not shown) of the tractor drawbar 44 is pivotally connected to the drawbar support or hitch 11. The center loop 40 on the plate 36 has a connecting bar 46 welded thereto, and the rear end of the bar 46 is apertured to receive a bolt or pin P which fastens into the apertured rear end of the tractor drawbar 44. The connecting bar 46 is welded at its front end to a transverse plate 47 which is notched to receive the drawbar 44. An upstanding bracket 51 is welded or otherwise secured to the side loops 38 and 39 and is notched, as at 52, to serve as a sector for an associated depth adjusting hand lever 54 that is pivoted, at 55, to the bracket 51. The sector or bracket 51 preferably is secured, as by bolts 56 or the like, to a bracket 57 that is welded to the hitch plate loop 39.

At each side of the implement there is a draft transmitting crank member 61 which includes a bar 62 having a laterally inturned end 63 and a laterally outturned section 64. Disposed about each laterally inturned end 63 is a sleeve 66 to which a gauge wheel arm 67 is fixed, as by welding. A set screw collar 67 is disposed at the inner end of the sleeve 66 and cooperates with the center loop 40 to hold the associated crank member 61 in place. These crank members 61 serve as draft transmitting members for transmitting draft to the lister beams 21 and 22. To this end, a pair of brackets 71 and 72 are fixed, as by bolts or the like, to the rear portion of each beam and the brackets 71 and 72 carry a transverse sleeve member 74 which receives the laterally outwardly extending section 64 of the crank axle 61. The sleeve 74 is made up of two sleeve sections 76, 77 with a set screw collar 78 disposed therebetween, the set screw collar 78 also being disposed between the upper ends 79 of the associated brackets 71 and 72. The rear end of each beam is shiftable on the laterally outwardly extending crank section 64 associated therewith into different positions of lateral adjustment and is held in that position by the associated set screw collar 78.

Each laterally outturned section 64 of the draft member 61 is preferably formed of a separate part and welded or otherwise fixed to the swinging end of the crank 62, with the inner end of the part 64 extending inwardly, as shown at 81 in Figure 1. Mounted on the inner end 81 of each transverse section 64 is a part in the form of a bell crank 83, one arm 84 of which (Figure 2), is connected by a link 85 to the gauge wheel arm 67 that is fixed to the sleeve 66 and mounted for free vertical swinging movement on the inner end 63 of the draft transmitting member. The upper end of each link 85 is apertured to receive a stud 87 that is formed on or carried by said one end 84 of the bell crank 83. The other arm 88 of the bell crank 83 extends upwardly and is apertured to receive the rear end of a link 91, the forward end of which is pivoted to the lever 54. Axle sections are formed on or carried by the gauge wheel arms 67 and receive ground-engaging gauge means in the form of gauge wheels 93 which are thus independently swingable by virtue of the independent movement of the gauge wheel arm 67. The hand levers 54, links 91, bell cranks 83 and links 85 constitute depth-controlling or gauge-shifting means.

The implement is adapted to be raised by a pair of power lift arms 101 connected to the power lift shaft 102 that forms a part of the power lift unit 6 on the tractor. Each arm 101 is connected by a chain 103 to the adjacent lister beam or some other part of the implement, preferably at such a point thereon that when the power lift is actuated to swing the arms 101 upwardly, the first effect is to raise the front ends of the beams 22 against the adjacent portions of the tractor axle, after which the lister bottoms are raised bodily out of the ground. The depth of operation of the lister may be easily and conveniently controlled by swinging the hand levers, either one or both of them, into different positions. Referring to Figure 2, swinging the hand lever 54 in a clockwise direction will cause the bell crank 83 to exert a downward thrust against the gauge wheel 93, and that in turn will cause the right hand lister bottom to run at a more shallow depth. If it is desired to have the lister bottom operate deeper, the hand lever 54 is swung in a counterclockwise direction.

The implement described above is especially adapted to be quickly attached and detached from the tractor. For example, referring to Figure 2, in order to disconnect the implement 20 from the tractor 1, all that it is necessary to do is to manually unhook the chains 27 from their notched supports 33, unhook the lifting chains 103 from their connection with the power lift arms 101, and lastly remove the pin P from the drawbar 44 and the attaching bar 46, and then drive away from the implement. If it should be desired to stabilize the implement so as to keep the hitch plate 35 at the same level with respect to the ground that it occupies when it is connected to the tractor, a pair of legs forming a stand are unhooked from their resting place over the associated draft transmitting crank member 62 and dropped to the ground. As best shown in Figure 3, each of these stand members is indicated by the reference numeral 110 and each includes a loop section 111 that is adapted to be placed over the crank 61 when the implement is in operation, and an eye section 112 which pivotally connects the member 110 to the journal portion 63 of the crank member 62. By using the stands 110, the implement 20 is left in a position to facilitate reengagement with the tractor. To effect a reengagement, the tractor 1 is backed into the implement in such a way as to cause the hitch plate 36 to enter the space between the plate 13 and the tractor hitch or drawbar support section 11. The drawbar 44 and the connecting strap 46 are then brought into register and the pin P inserted. All that remains to do to effect a connection of the implement with the tractor is to hook up the chains 27 and 103. The two lister bottoms 21 and 22 may be adjusted into different lateral positions by loosening the set screw collars 78 and shifting the beams into different positions, preferably unhooking the chains 27 from one notch and reconnecting them with another notch in the member 33 directly over the new position of the beams.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A two row tractor mounted lister comprising a pair of lister beams adapted to be disposed generally rearwardly of the tractor rear axle, a draft transmitting member adapted to be connected to the tractor in draft-receiving relation, a pair of draft transmitting links connected between said draft transmitting member and said lister beams, respectively, means connecting the front ends of said lister beams with the tractor, ground engaging gauge means swingably connected with said draft transmitting member, and adjustable means supporting the rear portion of each of said lister beams on said ground engaging gauge means.

2. An implement adapted to be mounted on a tractor; comprising a hitch member adapted to be connected for lateral movement with the rear portion of the tractor, a pair of longitudinally extending beams, a pair of draft transmitting members connected between said hitch member and portions of said beams rearwardly of the front ends thereof, and generally vertically adjustable means connecting the front ends of said beams with the tractor and accommodating lateral movement of said beams with said hitch member.

3. A two-bottom tractor mounted lister adapted to be mounted on a tractor, said lister comprising a hitch member adapted to be connected with the rear portion of the tractor, a pair of longitudinally extending lister beams, a pair of draft transmitting members connected between said hitch member and the generally rear portions of said beams, respectively, ground engaging gauge means pivotally connected with said hitch member for generally vertically swinging movement about a transverse axis thereon, and gauge-shifting means carried at least in part on said beams and reacting against said gauge means for controlling the depth of operation of the lister.

4. A tractor mounted two row implement comprising a hitch member adapted to be connected to the tractor in laterally extending relation, right and left hand ground-engaging tools, means swingably connecting said tools with said tractor separately from said hitch member for generally vertical movement relative to the tractor, a pair of vertically swingable gauge wheels connected for vertical swinging movement with said hitch member, said gauge wheels being disposed closely adjacent one another generally centrally of the tractor and disposed laterally inwardly, respectively, of the laterally innermost portions of said tools, draft transmitting means connected between said hitch member and said tools, and means for connecting the latter with said gauge wheels, respectively.

5. A tractor mounted two row implement comprising a detachable hitch member adapted to be connected to the tractor, right and left hand implement beams, each having ground-working means, disposed on opposite sides of said hitch member, draft transmitting means respectively connecting said implement beams with said hitch member, ground engaging gauge means disposed generally centrally between said implement beams, and a pair of depth adjusting means including parts mounted on said hitch member and connected with said gauge means and said implement beams, respectively, for adjusting the depth of operation of the ground-working means carried thereby.

6. A tractor mounted two row lister comprising a hitch member detachably connected with the rear portion of the tractor, a pair of gauge wheel arms independently swingable relative to said hitch member, a gauge wheel on each of said arms, a pair of draft transmitting members connected at their forward ends for vertical swinging movement to said hitch member, a pair of right and left hand lister units connected in draft transmitting relation to the rear ends of said vertically swingable draft members, a pair of depth adjusting levers pivotally mounted on said hitch member, a bell crank mounted on each of said lister units, means connecting one arm of each of said bell cranks to the associated gauge wheel arm, and means connecting the other arm of said bell crank to the associated depth adjusting lever.

7. For use in a tractor mounted implement of the type including a quick detachable connection between the implement and the tractor comprising a socket member adapted to be mounted on the tractor and a socket-entering member adapted to be mounted on said implement, the improvement which comprises a gauge wheel, means for swingably connecting said gauge wheel with said socket-entering member, a part adapted to be movably mounted on said implement and operatively connected with said gauge wheel for changing the position of the latter relative to the implement, and means adapted to react against said implement and operatively connected with said part for shifting the latter, said gauge wheel, said part and said part-shifting means being detachable from the tractor with said implement.

8. For use in a tractor mounted implement of the type including a quick detachable connection between the implement and the tractor comprising a socket member mounted on one of said tractor and implement and a socket-entering member mounted on the other of said tractor and implement, the improvement which comprises ground engaging gauge means, means swingably connecting said gauge means with the one of said members that is mounted on the implement, and shiftable means adapted to be mounted on said implement and connected with said swingable gauge means for controlling the operating position of the latter.

9. For use in a tractor mounted implement of the type including a quick detachable connection between the tractor and the implement comprising a socket member mounted on the rear portion of the tractor and including a rearwardly facing opening, and a socket-entering member carried by said implement normally in a position to enter said socket member when the tractor is backed relative to the implement, the improvement which comprises a gauge wheel arm adapted to be pivoted to said socket-entering member, a gauge wheel on the swinging end of said arm, and means connected with the latter and adapted to react against the implement for controlling the operating position of the gauge wheel relative to the implement.

10. An agricultural implement comprising a two row lister adapted to be mounted on a tractor, including a hitch member detachably connected with the tractor, a pair of generally rearwardly extending draft transmitting members pivotally connected at their forward ends with said hitch member and at their outer ends having laterally outwardly extending tool beam receiving sections, a pair of lister units mounted for lateral adjustment on said beam receiving sections, and ground engaging gauge means disposed between said lister units and connected with the inner portions of said tool beam receiving sections for controlling the position of said lister units.

11. A tractor mounted two row lister comprising a hitch member detachably connected with the tractor, a pair of generally rearwardly extending draft transmitting members pivotally connected at their forward ends with said hitch member and having laterally outwardly extending sections at their rear ends, lister units mounted on said laterally outwardly extending sections and adjustable laterally thereon to vary the row spacing, ground engaging gauge means swingably connected with said hitch member, a bell crank rockably mounted on the laterally inner end of each of said sections and having one arm connected with said gauge means, and means connected between said hitch member and the other arm of each of said bell cranks for adjusting the operating depth of said lister units.

12. A tractor mounted implement comprising a hitch member adapted to be connected to the tractor, a tool beam extending generally longitudinally of the tractor, a draft transmitting member swingably connected at its front end with said hitch member and at its rear end with said tool beam, ground engaging gauge means swingably connected with said hitch member, a bell crank mounted on said draft transmitting member and having one arm operatively connected with said gauge means, a depth adjusting lever pivoted to said hitch member, and means connecting said lever with the other arm of said bell crank whereby rocking movement of the latter by said lever acts against said gauge means for raising and lowering the tool beam.

13. An agricultural implement adapted to be mounted on a tractor having a hitch member receiving part, said implement comprising a hitch member adapted to be mounted detachably on said tractor part, gauge wheel means swingably connected with said hitch member, a tool receiving member swingably connected with said hitch member, and means connecting said gauge wheel member with said tool receiving member for determining the operating position of the latter.

14. For use in an agricultural implement adapted to be detachably connected with a tractor having a hitch plate receiving means, said implement comprising a hitch plate, a tool, and a member swingably connecting said tool with said hitch plate, the improvement which comprises ground engaging gauge means, means for movably connecting said gauge means with said hitch plate, means on the latter for adjusting the position of said gauge means relative to said tool means, and a supporting stand pivotally connected with said hitch plate and adapted to be swung in a ground engaging position for supporting the implement when it is detached from the tractor.

15. An implement comprising tool means including a pair of tool beams, a pair of draft transmitting members, each having front and rear generally laterally directed sections, means on each beam receiving one of said sections of said draft transmitting members, a common hitch member for both of said draft transmitting members, and means on said hitch member for receiving the other laterally directed section of each of said draft transmitting members.

WALTER H. SILVER.
ROBERT E. COX.

REFERENCES CITED

The following references are of record in the file of this patent:

UNITED STATES PATENTS

| Number | Name | Date |
|---|---|---|
| 1,384,944 | Flood | July 19, 1921 |
| 1,556,508 | Hentzell | Oct. 6, 1925 |
| 1,680,846 | Benjamin | Aug. 14, 1928 |
| 1,786,591 | Anderson | Dec. 30, 1930 |
| 1,885,763 | Ray | Nov. 1, 1932 |
| 1,893,619 | Geraldson | Jan. 10, 1933 |
| 1,939,950 | Brown | Dec. 19, 1933 |
| 1,981,443 | Winsor | Nov. 20, 1934 |
| 2,139,042 | Silver | Dec. 6, 1938 |
| 2,209,029 | Kriegbaum et al. | July 23, 1940 |
| 2,249,861 | Silver | July 22, 1941 |
| 2,339,225 | Strandlund | Jan. 11, 1944 |
| 2,339,830 | Zink et al. | Jan. 25, 1944 |
| 2,363,292 | Brown | Nov. 21, 1944 |
| 2,533,521 | Silver et al. | Dec. 12, 1950 |